O. MENGELBIER.
METHOD FOR EXTRACTING JUICES FROM ROOT FRUITS.
APPLICATION FILED MAY 11, 1914.
1,372,891. Patented Mar. 29, 1921.
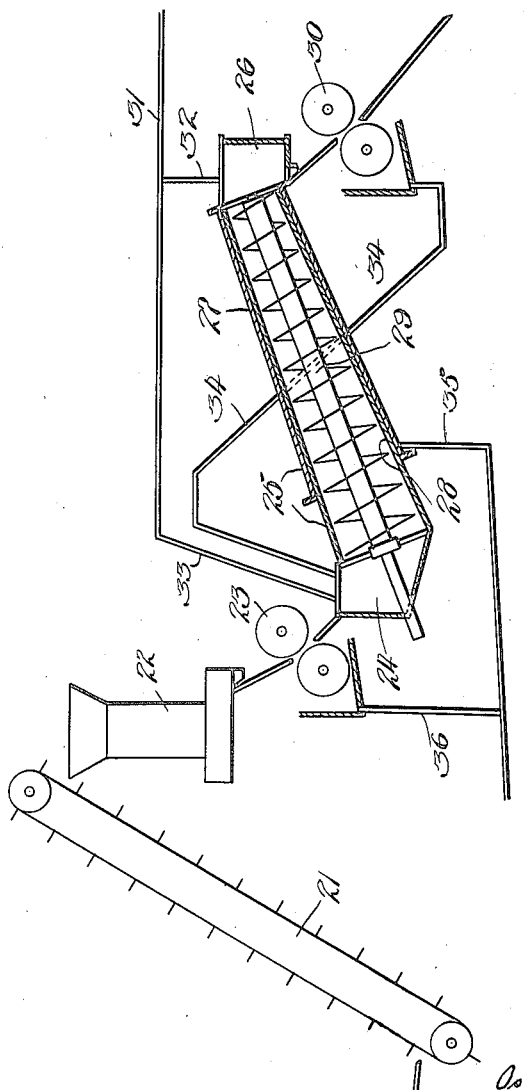

UNITED STATES PATENT OFFICE.

OSCAR MENGELBIER, OF BERLIN, GERMANY, ASSIGNOR, BY MESNE ASSIGNMENTS, TO THE CHEMICAL FOUNDATION, INC., A CORPORATION OF DELAWARE.

METHOD FOR EXTRACTING JUICES FROM ROOT FRUITS.

1,372,891.  Specification of Letters Patent.  Patented Mar. 29, 1921.

Application filed May 11, 1914. Serial No. 837,878.

*To all whom it may concern:*

Be it known that I, OSCAR MENGELBIER, a subject of the King of Prussia, residing at 11 Neue Ausbacherstrasse, Berlin, W., 20, Germany, have invented certain new and useful Improvements in Methods for Extracting Juices from Root Fruits, of which the following is a specification.

The present invention relates to a method for extracting juices from root-fruits and in particular from sugar-beets. The sugar has generally been drawn out from the beets by diffusion until a few years ago. Only during the last few years the juice has been obtained from beets through scalding and pressing or through pressing in combination with diffusion. In all of these processes the reduced beet is heated to a temperature of about 80° to 84° C., since the protoplasm of the plant cells is supposedly killed through heating above 60° C., and by this means the cell walls both for the diffusion process and the juice extracting were to be made more penetrable.

The heat operation might be advantageous for diffusion, but it possesses many disadvantages for pressing.

Beets become jellyish, so that any pressing by means of roller presses is rendered impracticable, because the rollers are unable to get hold of the slippery beets, that means, the heated beets break off when brought into the rolling press. For this reason only screw presses or spindle presses can be used for pressing heated beets, but with such presses the pressure attained is considerably lower, and as a consequence a smaller quantity of juice will be extracted, than what is the case with roller presses. Experience has shown that unheated beets or beet parts are firmly gripped by the rollers and run through the rollers, giving off juice abundantly. In this manner the greater portion of the juice is pressed out from beets without making heating necessary.

Still a considerable portion of the juice remains in the pressed residues. In order now to obtain this rest of the juice, as far as possible, the already pressed beets are imbibed by cold water or diluted juice, before each of one or more cold pressings at a temperature not exceeding 60° C.

The accompanying drawing shows diagrammatically an apparatus for carrying out the method.

The steps of operation in the method of the present invention are as follows:

The washed beets are first placed in a preliminary crusher consisting of rollers placed widely apart, so that the beets will be crushed into coarse pieces. Instead of crushing the beets in this manner they may also be cut with knives into slices, which however, should be made quite large.

The pieces or slices are now conveyed by means of an elevator 21 into a hopper 22, from which they pass through the first (two or multiple cylinder) roller press 23, in which the greatest quantity of juice is extracted. This juice is conveyed through conduit 36 to the factory. The beet remnants from the first pressing are thereupon imbibed by water or juice in a separate vessel 24 or in any other manner. While passing through the transporter 25 which conveys the imbibed beet remnants to the second imbibition vessel 26, the beets experience a slight squeezing.

The transporter 25 is preferably placed in an inclined position and depressed toward its upper end and comprises a stationary jacket 27 inclosing the greater portion of the inner casing 28, which is provided with perforations in the portion thereof that is covered by the jacket 27. Sufficient space is provided between the outer surface of the casing 28 and the inner surface of the jacket 27 for permitting juice to be carried off between them. A revolving worm 29 is mounted upon a solid spindle within the casing 28 for conveying the partly pressed out beet pieces to the upper imbibition vessel 26. On account of a tapering casing and the worm, the juice contained in the beet pieces will be squeezed out, passing through the perforations in the casing, and being collected by the jacket 27 from which it is carried away to the factory by means of a conduit 35. This double imbibition with the middle pressing in the transporter 25 is however not implicitly necessary, as the beet remnants may be conveyed directly from the roller press 23 to the roller press 30 with only one imbibition. The main imbibition with cold water must in any case always take place immediately before the final pressing in the roller press 30.

For this purpose the conduit 31, 32 for cold water is provided which also supplies the vessel 24, when used, with water through conduit 33. On leaving the vessel 26 the beet remnants pass to the final roller press 30, whereupon the mass, now deprived of all sugar is carried off and dried for fodder or other purposes. The juice from roller press 30 is pumped through conduit 34 to vessel 24 for imbibing the beet pieces passing through that vessel. The rollers for the presses 23 and 30 are all solid faced, that is, they are not perforated, but they may be knurled or rifled to get a good grip on the beets.

Tests have shown that this manner of operation combines the advantages of the older diffusion operation with those of the newer so-called scalding or pressing processes, because the beets are in the present method deprived of the sugar as thoroughly as through diffusion and the residues contain a great quantity of drying substance. Moreover the very unpleasant discharge waters are entirely avoided, as all extracts from the presses are consumed in working in the factory.

Beside the above named advantages, the cold treatment possesses many other ones over the heating processes. One more such advantage will here be mentioned. It is well known that a juice refining process such as the sulfurous acid method, can only be used for cold juices without danger of formation of sulfuric acid in the juice. It is therefore necessary to again cool the warm extracted juices from the diffusion or other processes to make it sour while cool and to again heat it to evaporation temperature if the sulfuric acid method is going to be applied.

The loss of heat, which is caused by the recooling and reheating of the juices, makes the utility of the sulfuric acid method very doubtful, without taking into account the great danger of a considerable loss of sugar.

In the applicant's process, on the other hand, the cold juices, coming directly from the presses, may be at once treated with sulfurous acid, without the loss of heat and sugar.

The object of the present method, retains also its character, if, for some reason or another, as for instance, with frozen beets, a slight warming of the beets or the imbibing liquid or of both, is found necessary. The warming should, however, not be carried too far so as to cause the above mentioned changes in the substance of the beets.

I claim:—

The process of recovering the sap from sugar beets, which consists in separating the beets into relatively coarse pieces or slices then subjecting said pieces to the pressing action of imperforate roughened cylindrical surfaces, and then imbibing the residue in a thin liquid and again subjecting it to the action of cylindrical surfaces, the temperature being maintained not in excess of 60° throughout the operation.

The foregoing specification signed at Sagua La Grande, Cuba, this 20th day of April, 1914.

OSCAR MENGELBIER.

In presence of two witnesses—
EUGENE E. JOVA,
PEDRO P. ARÓZTEGUI.